United States Patent
Akao et al.

(10) Patent No.: US 6,794,341 B2
(45) Date of Patent: Sep. 21, 2004

(54) PEAK TORQUE LOWERING COMPOSITION, PART WITH SLIDING PART USING THE COMPOSITION, AND PRESS-FITTING METHOD USING THE COMPOSITION

(75) Inventors: Yuji Akao, Nishitokyo (JP); Masayuki Koike, Nishitokyo (JP)

(73) Assignee: Citizen Watch Co., Ltd., Tokyo (JP)

(*) Notice: Subject to any disclaimer, the term of this patent is extended or adjusted under 35 U.S.C. 154(b) by 0 days.

(21) Appl. No.: 10/312,497

(22) PCT Filed: May 8, 2002

(86) PCT No.: PCT/JP02/04455

§ 371 (c)(1),
(2), (4) Date: Dec. 27, 2002

(87) PCT Pub. No.: WO02/090618

PCT Pub. Date: Nov. 14, 2002

(65) Prior Publication Data

US 2003/0109387 A1 Jun. 12, 2003

(30) Foreign Application Priority Data

May 9, 2001 (JP) .................................. 2001-138112

(51) Int. Cl.[7] .................... C10M 137/02; C10M 141/10
(52) U.S. Cl. .................... 508/433; 508/441; 508/442; 508/459; 508/496; 508/497; 508/563; 508/584
(58) Field of Search ................. 508/433, 441, 508/442

(56) References Cited

U.S. PATENT DOCUMENTS 3,791,488 A * 2/1974 Rowe et al. ................. 184/109
3,901,726 A * 8/1975 Snearly ......................... 134/1
3,928,218 A * 12/1975 Rowe et al. ................. 508/208
5,792,733 A * 8/1998 Minami et al. .............. 508/422
6,136,759 A * 10/2000 Takagi et al. ............... 508/272

FOREIGN PATENT DOCUMENTS

| JP | 04-074992 B2 | 3/1992 |
| JP | 196747 A | 8/1993 |
| JP | 03-099712 B2 | 5/1994 |
| JP | 06-123783 A | 5/1994 |
| JP | 08-062344 B2 | 3/1996 |

OTHER PUBLICATIONS

Smalheer et al, Lubricant Additives, Section I–Chemistry of Additives, p. 1–11, 1967.*

* cited by examiner

*Primary Examiner*—Ellen M. McAvoy
(74) *Attorney, Agent, or Firm*—Webb Ziesenheim Logsdon Orkin & Hanson, P.C.

(57) ABSTRACT

The peak-torque descending composition of the present invention contains a certain amount of an extreme pressure agent comprising at least neutral phosphate esters and/or neutral phosphite esters in a solvent comprising hydrocarbons and/or ethers. Further, a certain corrosion inhibitor may be contained. The part having a sliding portion of the present invention is surface-treated with the above composition. The process for producing a component or precision machine having a sliding portion, including immersing a part having a sliding portion in the above composition to adhere or absorb the composition onto the surface of the part. The press fit method of the present invention includes preliminarily immersing the metal plate or the metal shaft in the peak-torque descending composition to adhere or absorb the composition onto an inner surface of a hole.

22 Claims, No Drawings

PEAK TORQUE LOWERING COMPOSITION, PART WITH SLIDING PART USING THE COMPOSITION, AND PRESS-FITTING METHOD USING THE COMPOSITION

BACKGROUND OF THE INVENTION

1. Field of the Invention

The present invention relates to a peak-torque descending composition for lowering a peak torque at a slide initiation of a precision machine or component having a sliding portion, particularly, a peak-torque descending composition effective for lowering the peak torque at an initiation of a watch component, a part having a sliding portion using the composition, a process for producing a precision machine or component having a sliding portion using the peak-torque descending composition, and a precision machine or component produced by the process.

Further, the present invention relates to a press fit method capable of preventing a deformation (referred to as so-called "a burr of metal") that peripheral portions of a hole on a metal plate are lifted up when a metal shaft is pressed into the metal plate.

2. Description of the Related Art

Precision machines and components having a sliding portion are mostly made of metals and plastics. Considerable numbers of metallic components are made by imbedding two or more tiny parts. The reasons why they are made by imbedding are that there are cases of letting the parts slide into one another in addition to the case that the parts cannot be integrally processed in a process for the production. When metals are pressed into one another by pressure, adhesion and fusion bond generally occur. A peak torque is produced when tried to slide a portion of adhesion or fusion-bond. In the cases of precision machines made of a combination of metallic and plastic components, there are some cases where the peak torque at the initiation of slide must be lowered to an appropriate and stable level of the peak torque which does not damage the plastic component, because the plastic component is potentially damaged when the peak torque is too large.

The most common watch as a precision machine is described below. The present invention is not limited to watch mechanism, but can be used for, for example, components for bearing and the like.

Watches are broadly divided into mechanical and electronic watches. The mechanical watches are operated by spiral spring as driving source, whereas the electric watches are operated by electric power. In both of the mechanical and electronic watches, a time is displayed by combining a gear train wheel portion assembling rotating gearwheels to drive an hour hand, a minute hand and a second hand and a sliding portion such as a lever. Metals and plastics are used as materials for watches considering processability and strength.

The watch has a function to adjust a time. In order to adjust the time, a slip mechanism is required to rotate an hour hand and a minute hand with fixing a second hand at a constant location (e.g., a location of 12 o'clock) both in the mechanical and electric watches.

In a transmission system of the watch, a magnetic rotor is rotated at 180 degrees per second. This is transmitted in the following sequence to drive each hand. In the transmission system, a motion is transmitted sequentially from the rotor, a fifth wheel, a fourth wheel (drive a second hand), a third wheel, a center wheel (drive a minute hand), a minute wheel and a hour wheel (drive a hour hand).

Generally in the watch, when a crown is pulled to adjust the time, a clutch wheel is connected to the minute wheel, and in this state when the crown is rotated, the clutch wheel is rotated. When the clutch wheel is rotated, the hour wheel is rotated through the minute wheel to be able to move the hour hand. Also, the minute wheel rotates a center wheel pinion. Since the minute hand is attached to the center wheel pinion, the minute hand can be rotated. That is, by rotating the minute wheel, the time can be adjusted with engaging the hour and minute hands simultaneously by rotating the crown.

Since the train wheel portion of the watch is engaged, the rotor will be also rotated if leaving as it is. Therefore, the slip mechanism to rotate only necessary gearwheels is provided not to rotate the rotor by combining with a brake mechanism.

The watch is generally provided with a portion to perform slip in the center wheel.

The slip mechanism essentially functions to adjust the time, and an appropriate torque and no large value of the peak torque at an initial rotation are desired. When the peak torque is high, if a less rigid plastic material and the like are used as parts from the rotor to the third wheel, the gearwheels made of such a material are chipped to damage the watch.

There have been various proposals as structures of the center wheel which is a gearwheel body having the slip mechanism.

For example, Japanese Patent No. 2808842 describes a process for producing a watch component by incorporating a watch gearwheel into a base component when assembling a watch comprising the watch gearwheel having a slip portion between a gearwheel shaft and a gearwheel portion and the base component supporting the watch gearwheel on a shaft, by employing a method of lubrication on the surface portion opposite to the gearwheel portion and proximate to the slip portion in the base component. In this process, lubrication is carried out before incorporating the watch gearwheel into the base component, and it is not carried out in other steps, and thus, if the condition of no lubrication before the incorporation occurs, there is a possibility that the resultant watch component becomes an inferior article. Additionally, this method has a problem in that handling of stickiness with oil and so on becomes complicated since oil adheres to the components.

Japanese Patent No. 2795809 proposes a slip mechanism applied for a minute hand wheel and so on of the watch, which is a structure of a part supporting the slip portion. According to the slip mechanism of the watch described in this patent, the watch components having a slip mechanism can be assembled with a slight force. However, phenomena of adhesion and fusion bond of metals one to another arise after the components are assembled because the metals are grazed one to another at the assembling, and the peak torque becomes high when slipped in the initial stage. Thus, this mechanism has a problem in that the gearwheels are chipped in a watch using plastic gearwheels.

Japanese Patent Publication No. 16705/1996, Japanese Patent Laid-Open Nos. 123783/1994 and 196747/1993 propose a center wheel (also referred to as a second wheel) combining a metal pinion and a resin gearwheel. In the slip mechanism of the watch described in these patents, there are problems that the production of watch components takes much time and requires complicated procedures due to the complex structure, and abrasion resistance is inferior since the slip portion is resin.

Accordingly, the present inventors have made intensive studies to solve the above problems, and as a result, they have found that by a process comprising the steps of immersing a metal gearwheel or a metal pinion in a composition containing from 0.01 to 5% by weight of an extreme pressure agent (anti-seizing agent) comprising a neutral phosphate ester and/or neutral phosphite ester in a solvent of a hydrocarbon and/or ether to adhere or absorb the composition to the surface thereof, immediately thereafter, taking out the gearwheel or the pinion from the composition, and drying, prior to assembling the gearwheel body having a slip mechanism of the metal gearwheel and the metal pinion, a gearwheel body can be assembled without developing a large peak torque at an initial stage when slipped and chipping wheel teeth of the gearwheel even when the plastic gearwheel is used. Also, they have found that a burr phenomenon does not occur on a metal plate when a metal shaft without such surface treatment is press-fitted into a hole of a metal plate of which surface is treated as in the above manner using the composition. Further, they have found that a burr phenomenon does not occur on a metal plate when a metal shaft of which surface is treated as in the above manner using the composition is press-fitted into a hole of a metal plate without such surface treatment. Based on these findings, the present invention has been completed.

SUMMARY OF THE INVENTION

The present invention is made to solve the problems of the prior art as described above, and an object of the invention is to provide a peak-torque descending composition capable of assembling a gearwheel body having a slip mechanism which can be made from metallic materials with a simple structure wherein a large peak torque is not produced in an initial stage when slipped and wheel teeth of the gearwheel are not chipped even when the gearwheel is plastic, a part having a sliding portion such as a gearwheel portion and the like using the composition, a process for producing a component or precision machine having a sliding portion using the above composition, and a component or precision machine produced by the process.

Another object of the present invention is to provide a press fit method for preventing the occurrence of a burr phenomenon on pressing a shaft into a metal plate.

The peak-torque descending composition of the present invention contains 0.01 to 5% by weight of an extreme pressure agent comprising at least one member selected from the group consisting of neutral phosphate esters and neutral phosphite esters in a solvent comprising at least one member selected from the group consisting of hydrocarbons and ethers.

The peak-torque descending composition of the present invention may further contain at least one corrosion inhibitor (antirust agent) selected from the group consisting of ester corrosion inhibitors, corrosion inhibitors of partial esters of isodecyl succinate and ethylene oxide (ASA) and straight-chain fatty acid corrosion inhibitors.

For the peak-torque descending composition for drying at normal temperatures, the boiling point of the solvent is preferably 130° C. or below.

The concentration of the corrosion inhibitor is preferably from 0.01 to 0.5% by weight based on 100% by weight of the peak-torque descending composition and is preferably equal to or less than the concentration of the extreme pressure agent.

The part having a sliding portion of the present invention is characterized in that the surface is treated with the peak-torque descending composition of the present invention.

As the part having a sliding portion, watch parts can be mentioned.

The above part of the present invention includes, for example, a gearwheel body having a slip mechanism and having a metal gearwheel and a metal pinion, wherein at least one of the gearwheel and the pinion is surface-treated with the peak-torque descending composition of the present invention prior to assembling the gearwheel body (e g., watch parts) using the gearwheel and pinion.

The process for producing a component or precision machine having a sliding portion of the present invention comprises immersing a part having a sliding portion in the peak-torque descending composition of the present invention, adhering or absorbing the composition onto the surface of the part, immediately thereafter, taking out the part from the composition, followed by drying, and assembling a component or precision machine using the parts.

The component or precision machine having a sliding portion of the present invention is a component or precision machine produced by the above process.

Specific examples of the assembled component include a gearwheel body for a watch having a slip mechanism and comprising a metal gearwheel and a metal pinion. Also, specific examples of the precision machines include a watch using the gearwheel body.

In the process for producing a component or precision machine of the present invention, the drying is preferably a drying at normal temperatures, and especially warm air drying at normal temperatures is preferable.

The press fit method of the present invention comprises, prior to pressing a metal shaft into a metal plate, immersing the metal plate or the shaft in the peak-torque descending composition of the present invention and adhering or absorbing the composition onto the inner surface of a hole for press fit of the metal plate or the surface of the shaft, immediately thereafter, taking out the metal plate or the shaft from the composition, and drying.

DETAILED DESCRIPTION OF THE PREFERRED EMBOIMMENTS

The peak-torque descending composition, the part having a sliding portion using the composition, the process for producing a component or precision machine having a sliding portion using the composition, and a component or precision machine produced by the process as well as the press fit method using the composition of the present invention are specifically described below.

The peak-torque descending composition of the present invention contains a specific solvent and a specific extreme pressure agent. In addition, the peak-torque descending composition of the present invention may further contain a specific corrosion inhibitor, if necessary.

The solvent used in the present invention is preferably hydrocarbons or ethers, and is especially preferably hydrocarbons. As the solvent, there can be used one or more hydrocarbons, one or more ethers, or a combination of at least one hydrocarbon and at least one ether.

The hydrocarbons specifically include straight saturated hydrocarbons such as hexane, octane, heptane, nonane, decane, undecane and tridecane; branched saturated hydrocarbons such as methylbutane, isopentane, neopentane, isohexane, 2,4-dimethylhexane and 2,3,6-trimethyl heptane; unsaturated hydrocarbons wherein a part of said straight or branched saturated hydrocarbons includes an unsaturated bond; cyclic hydrocarbons such as cyclohexane, methylcyclohexane and 1,3-cyclohexanediene; aromatic hydrocarbons such as benzene, toluene and xylene; condensed polycyclic hydrocarbons such as indene, naphthalene and phenanthrene; and spiro hydrocarbons such as spiro(4,4) nonane.

The ethers include the compounds having an ether bond in a part of the above hydrocarbon compounds. For example, there can bementioneddiethyl ether, methylbutyl ether, dioxane, oxolane, 1,3-dioxolane, pyran, 2-octylfuran and the like.

The solvent used in the present invention can be any one as long as it can dissolve an extreme pressure agent. However, as a result of comparing the performance using various solvents, it has been found that hydrocarbon of a non-polar solvent is most excellent. This is because when the extreme pressure agent is chemically absorbed on a metal surface using a polar solvent, the solvent is also absorbed on the metal surface, so that the extreme pressure agent can not efficiently coat on the metal surface. Therefore, a solvent having a small polarity is better for the peak-torque descending composition.

The extreme pressure agent used in the present invention is neutral phosphate ester and/or neutral phosphite ester.

The neutral phosphate esters specifically include tricrezilphosphate, trixylenylphosphate, trioctylphosphate, trimethylolpropane phosphate, triphenyl phosphate, tris (nonylphenyl) phosphate, triethyl phosphate, tris (tridecyl) phosphate, tetraphenyl dipropyleneglycol diphosphate, tetraphenyl tetra (tridecyl) pentaerythritol tetraphosphate, tetra (tridecyl)-4,4'-isopropyridene diphenyl phosphate, bis (tridecyl) pentaerythritol diphosphate, bis (nonylphenyl) pentaerythritol diphosphate, tristearyl phosphate, distearyl pentaerythritol diphosphate, tris (2,4-di-t-butylphenyl) phosphate, hydrogenated bisphenol A pentaerythritol phosphate polymer and the like.

The neutral phosphite esters specifically include trioleyl phosphite, trioctyl phosphite, trimethylolpropane phosphite, triphenylphosphite, tris (nonylphenyl) phosphite, triethyl phosphite, tris (tridecyl) phosphite, tetraphenyl dipropyleneglycol diphosphite, tetraphenyl tetra (tridecyl) pentaerythritol tetraphosphite, tetra (tridecyl)-4,4'-isopropylidene diphenyl phosphite, bis (tridecyl) pentaerythritol diphosphite, bis (nonylphenyl) pentaerythritol diphosphite, tristearyl phosphite, distearyl pentaerythritol diphosphite, tris (2,4-di-t-butylphenyl) phosphite, hydrogenated bisphenol A pentaerythritol phosphite polymer and the like.

These can be used alone or in combination with two or more.

As the extreme pressure agents, there can be mentioned sulfur agents such as molybdenum dithiophosphate, molybdenum dithiocarbamate, isobutylene sulfide, di-t-nonyl polysulfide, dibenzyl sulfide and the like, phosphate ester and phosphite ester. However, the present inventors studied on these extreme pressure agents, and as a result, they have found that when the sulfur extreme pressure agent, the acidic phosphate ester extreme pressure agent or acidic phosphite ester extreme pressure agent was used, rust arose. Therefore, in the present invention, the neutral phosphate ester and neutral phosphite ester having excellent in not only an anti-seizing property but also corrosion resistance are used.

The concentration of the extreme pressure agent in the peak-torque descending composition (in the case of the peak-torque descending composition consisting of the solvent and the extreme pressure agent, the concentration is in regard to the solvent) is preferably in the range of from 0.01 to 5% by weight. Even when the concentration of the extreme pressure agent is more than 5% by weight, the effect does not change. However, since the extreme pressure agent undesirably deposits on a metal surface after evaporating the solvent, it is preferred that the upper limit of the concentration of the extreme pressure agent is 5% by weight. On the other hand, when the concentration of the extreme pressure agent is less than 0.01% by weight, the treatment effect cannot be attained. Therefore, it is preferred that the lower limit of the concentration of the extreme pressure agent is 0.01% by weight.

As mentioned above, the extreme pressure agent is necessary to be added to the solvent in an amount of the concentration for the solvent ranging from 0.01 to 5% by weight. However, in order to stabilize the effect of the surface treatment, it is more preferable to add to the solvent in an amount of the concentration ranging from 0.1 to 0.5% by weight.

The corrosion inhibitor can be added to the peak-torque descending composition of the present invention, if necessary.

The corrosion inhibitor is effective particularly when the component is stored for a long time after being treated with the peak-torque descending composition.

The corrosion inhibitor, like the extreme pressure agent, is chemically absorbed to a metal surface, and as a result, an adhered amount of the extreme pressure agent to the metal surface is decreased and its treatment function is lowered. Therefore, it is necessary to control the amount of the corrosion inhibitor to be added.

The corrosion inhibitors specifically include ester corrosion inhibitors such as sorbitan monoester and pentaerythritol monoester; partial ester (ASA) corrosion inhibitor of isodecyl succinate and ethylene oxide, sulfonate corrosion inhibitors, amine salt corrosion inhibitors, straight chain fatty acid corrosion inhibitors and the like. However, as a result that the present inventors studied on each corrosion inhibitor, it has been found that ester, ASA and straight chain fatty acid corrosion inhibitors are excellent for the present invention.

The corrosion inhibitor is preferably added in an amount of from 0.01% to 0.5% by weight based on 100% by weight of the peak-torque descending composition. When the amount of the corrosion inhibitor to be added is small, an effect of corrosion resistance is not exerted. On the other hand, when it is too large, the treatment function of the extreme pressure agent is lowered. Therefore, the upper limit of the corrosion inhibitor is preferably 0.5% by weight. Also, it is preferable that the amount of the corrosion inhibitor is equal to or less than that of the extreme pressure agent.

The peak-torque descending composition of the present invention may further contain additives such as anti-oxidant and the like in the range which do not disturb the objectives of the invention.

As the anti-oxidant, phenol anti-oxidant and/or amine anti-oxidant are preferable.

The amine anti-oxidant is preferably diphenyl amine derivatives.

Also, the phenol anti-oxidant is preferably at least one compound selected from 2,6-di-t-butyl-p-cresol, 2,4,6-tri-t-butyl phenol and 4,4'-methylene bis (2,6-di-t-butyl) phenol.

The peak-torque descending composition-of the present invention is a treating solution effective for the metal parts as described above.

The treating methods of the metal parts include a method in which the metal part is immersed in the peak-torque descending composition. In order to treat the entire surface of the part without unevenness, it is preferred that the part is immersed with sonication. The similar result can also be attained by oscillation. However, the sonication is more preferable than the oscillation in the case of that the part is small and further in a tubular shape. The treating time is sufficient to be from about 30 seconds to about 5 minutes.

After treating the metal part with the peak-torque descending composition, drying at normal temperatures, preferably air-drying at normal temperatures is carried out. The normal temperature used here in is referred to the temperature ranging from 15 to 25° C. In the case of using the solvent which is hard to dry, it is necessary that the temperature of warm air is elevated and that the time period for drying is prolonged. Therefore, it is advantageous that the compound which is easy to dry is used as the solvent. The solvent suitable for drying at a normal temperature is a solvent having a boiling point of 130° or less.

The solvents include hydrocarbons having a boiling point of 130° or less among the hydrocarbons mentioned above, such as nonane, hexane, isohexane, heptane, isoheptane and benzene; and ethers such as diethyl ether, ethylvinyl ether and isopropylmethyl ether.

Further, in the step for surface treatment of a metal part with the peak-torque descending composition in the present invention, hot-air drying can be carried out after treating the metal part with the peak-torque descending composition. In the case of using the solvent which is hard to dry, it is necessary that the temperature of hot air is elevated and that the time period for drying is prolonged. Thus, it is advantageous that the compound which is easy to dry is used as the solvent. The temperature of hot air is desirably in the range of from 120 to 150° C. considering safety.

The boiling point of a solvent capable of drying within 30 minutes at hot-air temperature ranging from 120 to 150° C. is 180° C. or less. As such solvents, there can be mentioned n-decane (boiling point; 174° C.) and the like in straight chain hydrocarbons.

The part having a sliding portion of the present invention is surface-treated with the peak-torque descending composition of the present invention.

The part having a sliding portion includes a gearwheel body having a slip mechanism made of a metal gearwheel and a metal pinion, for example, a watch part wherein the gearwheel or the pinion is surface treated with the peak-torque descending composition at least prior to assembling the gearwheel body.

The process for producing a component or a precision machine having a sliding portion of the present invention comprises immersing a part, for example, a watch part, in the peak-torque descending composition of the present invention, adhering or absorbing the composition on the surface of the part, immediately thereafter, removing the part from the composition, followed by drying at a normal temperature, preferably with air at a normal temperature, and assembling a watch component or watch (precision machine) using the dried part. As already mentioned above, the above drying can be also carried out with hot air at from 120 to 150° C.

The component or precision machine having a sliding portion of the present invention includes a component or precision machine produced by such a process, for example, a gearwheel body for a watch having a slip mechanism made of a metal gearwheel and a metal pinion or a watch using this gearwheel body for a watch.

The press fit method of the present invention, on pressing a metal shaft into a metal plate, comprises previously immersing the metal plate or the shaft in the peak-torque descending composition of the present invention, adhering or absorbing the composition onto an inner surface of a hole for press fit of the metal plate or onto the surface of the shaft, immediately thereafter, taking out the metal plate or the shaft from the composition, followed by drying. By performing such surface treatment, no large stress arises even when the metal shaft is pressed into the metal plate, and therefore, burr phenomenon of the metal does not occur.

EXAMPLE

The present invention is explained with reference to the following examples, but the invention is not limited to these examples.

In the Examples, as a part to be treated using the peak-torque descending composition of the present invention, a center wheel used for Watch #10 produced by Citizen Watch Co., Ltd. was chosen. The center wheel of #10 of a gearwheel body comprises a gearwheel having a structure referred to H spring and a center wheel pinion. Both the gearwheel and pinion are made of metals. The pinion is made of iron and the gearwheel is made of brass. In order to assemble the gearwheel body, it is enough that the gearwheel with H spring structure is fitted into the pinion with pressure. Problematic adhesion and fusion bond arise on fitting into. The maximum peak torque at an initial stage is produced when intended to rotate gearwheel and pinion with adhesion or fusion bond. That is, the maximum peak torque produces at the first time slip. Further, plastic gearwheels are also used for this watch.

In treating the center wheel, the effect is attained by treating at least either the gearwheel or the pinion. However, the both may be treated.

In the watch, the effect of lowering the peak torque is extremely high when the center wheel having a slip portion is treated with the peak-torque descending composition of the present invention.

EXAMPLES 1 AND 2, AND COMPARATIVE EXAMPLES 1 AND 2

(Selection of a Solvent Suitable for the Peak-torque Descending Composition)

Hexane as a hydrocarbon solvent (Example 1), diethyl ether as an ether solvent (Example 2), isopropyl alcohol as an alcohol solvent (Comparative Example 1) and ethyl acetate as an ester solvent (Comparative Example 2) were prepared.

0.1% by weight of tri-n-butyl phosphite belonging to neutral phosphite ester was added as an anti-sticking agent to each of the above solvents to obtain 4 types of peak-torque descending compositions.

Next, the pinion was placed in a beaker containing the peak-torque descending composition, and sonicated for 3 min. Subsequently, the pinion was taken out from the beaker using a strainer, and dried with hot air at from 120 to 150° C. to yield the pinion treated with the peak-torque descending composition.

Next, the center wheel having the slip portion for Watch #10 produced by Citizen Watch Co., Ltd. was made using the pinion obtained by treating as described above and the gearwheel without the treatment.

The slip torque of the thus made center wheel was measured using a torque meter. The peak (maximum) value of slip torque when the wheel initially began to move was the measured value. It has been found that the wheel teeth of the plastic gearwheels used for the gear train portion are chipped when the slip torque is over 15 g.

As the results of the measurement of the slip torque, the peak (maximum) values of the slip torque were 10 g in the case of using hexane, 11 g in the case of diethyl ether, 15 g in the case of isopropyl alcohol, and 14 g in the case of using ethyl acetate as the solvent.

From the above, it has been found that the use of hydrocarbon or ether is better as the solvent.

EXAMPLES 3 AND 4, AND COMPARATIVE EXAMPLES 3 AND 4

(Selection of an Extreme Pressure Agent Suitable for the Peak-torque Descending Composition)

As an extreme pressure agent, tricresyl phosphate (Example 3) belonging to neutral phosphate ester, trixylenyl phosphite (Example 4) belonging to neutral phosphite ester, molybdenum dithiophosphate (Comparative Example 3) having sulfur in the molecule, and dibenzyl sulfide (Comparative Example 4) having sulfur in the molecule were added each in an amount of 0.3% by weight to nonane which is a hydrocarbon solvent to prepare 4 types of peak-torque descending compositions.

Next, the pinion was placed in a beaker containing the peak-torque descending composition, and sonicated for 3 min. Subsequently, the pinion was taken out from the beaker using a strainer, and dried with hot air at from 120 to 150° C. to yield a pinion treated with the peak-torque descending composition.

Next, the center wheel having a slip portion for Watch #10 produced by Citizen Watch Co., Ltd. was made using the pinion obtained by treating as described above and the gearwheel without the treatment.

The peak (maximum) value of the slip torque of the thus made center wheel was measured in the same manner as in Example 1. As mentioned in Example 1, it has been found that the wheel teeth of the plastic gearwheels used for the gear train portion are chipped when the slip torque is over 15 g.

As the results of measurement of the slip torque, the peak (maximum) values of the slip torque were 12 g or less and were good in all cases examined.

Next, the high temperature and high humidity test was carried out where the gearwheel was stored under the circumstance at 45° C. and at a relative humidity of 95% for one month. As a result, no discoloration was observed in the cases of the parts using neutral phosphite ester and neutral phosphate ester, whereas discoloration was observed in the cases using molybdenum dithiophosphate and dibenzyl sulfite.

From the above, it has been found that neutral phosphate ester or neutral phosphite ester is excellent as the extreme pressure agent.

EXAMPLES 5 TO 12, AND COMPARATIVE EXAMPLES 5 TO 7

(Experiment to Obtain an Optimum Concentration of the Extreme Pressure Agent)

Tristearyl phosphite which is a neutral phosphite ester was added in an amount of 0.005% by weight (Comparative Example 5), 0.01% by weight (Example 5), 0.05% by weight (Example 6), 0.1% by weight (Example 7), 0.25% by weight (Example 8), 0.5% by weight (Example 9), 1% by weight (Example 10), 3% by weight (Example 11), 5% by weight (Example 12), 7% by weight (Comparative Example 6) or 10% by weight (Comparative Example 7) to nonane which is a hydrocarbon solvent to prepare peak-torque descending compositions.

Next, the pinion was placed in a beaker containing the peak-torque descending composition, and sonicated for 3 min. Subsequently, the pinion was taken out from the beaker using a strainer, and dried with hot air at from 120 to 150° C. to yield a pinion treated with the peak-torque descending composition.

Next, the center wheel having a slip portion for Watch #10 produced by Citizen Watch Co., Ltd. was made using the pinion obtained by treating as described above and the gearwheel without the treatment.

The peak (maximum) value of the slip torque of the thus made center wheel was measured in the same manner as in Example 1 As mentioned in Example 1, it has been found that the wheel teeth of the plastic gearwheels used for the gear train portion are chipped when the slip torque is over 15 g.

As the results of measurement of the slip torque, when the added amount of tristearyl phosphite was 0.005% by weight, the peak value of the slip torque became 20 g or more which was the value exceeding the measurable limit of the torque meter. When the added amounts of tristearyl phosphite were 0.01%, 0.05% and 0.1% by weight, the peak values of the slip torque were 12 g, 10 g and 9.8 g, respectively. When the added amount of tristearyl phosphite were 0.25%, 0.5%, 1%, 3%, 5%, 7% and 10% by weight, the peak values of the slip torque were 10 g or less in all cases.

Upon observation of these pinions, when the added amount of tristearyl phosphite was 7% by weight or more, the extreme pressure agent deposited on the surface. This showed that the treated pinions are poor in appearance, and they can not be used as the part for the watch.

Correspondingly, when only the gearwheel was treated or both of the gearwheel and the pinion were treated, similar results were obtained as that in the case where only the pinion was treated. From these results, it has been found that the effect can be obtained when at least either one was treated.

When the center wheel treated with the extreme pressure agent at a concentration of from 0.01 to 5% by weight, which was a conforming article in the above experiment, was installed in Watch #10 produced by Citizen Watch Co., Ltd. and the operation was confirmed, no lacking of wheel teeth occurred and the operation was good in all cases examined.

From the above results, it has been found that the concentration of the extreme pressure agent is preferably in the range of from 0.01 to 5% by weight, more preferably in the range of from 0.1 to 0.5% by weight.

EXAMPLES 13 TO 15 AND COMPARATIVE EXAMPLES 8 TO 9

Selection of a Corrosion Inhibitor Suitable for the Peak-torque Descending Composition.

To nonane which is a hydrocarbon solvent, 0.25% by weight of trioleyl phosphite which is neutral phosphite ester was added as the extreme pressure agent, and further, as a corrosion inhibitor, pentaerythritol monobutyl ester, ASA corrosion inhibitor represented by the following chemical formula, stearic acid belonging to straight chain fatty acids, sulfonate corrosion inhibitor [trade name: NA-SUL 729, maker: King Ltd., USA], or amine salt corrosion inhibitor [trade name: NA-SUL EDS, maker: King Ltd., USA] was added each in an amount of 0.25% by weight to prepare 5 types of peak-torque descending compositions.

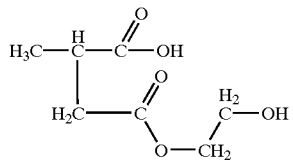

Next, the pinion was placed in a beaker containing the peak-torque descending composition and sonicated for 3 min. Subsequently, the pinion was taken out from the beaker using a strainer, and dried with hot air at from 120 to 150° C. to yield a pinion treated with the peak-torque descending composition.

Next, the center wheel having the slip portion for Watch #10 produced by Citizen Watch Co., Ltd. was made using the pinion obtained by treating as described above and the gearwheel without the treatment.

The peak (maximum) value of the slip torque of the thus made center wheel was measured in the same manner as in Example 1. As mentioned in Example 1, it has been found that the wheel teeth of the plastic gearwheels used for the gear train portion are chipped when the slip torque is over 15 g.

As the results of measurement of the slip torque, in the cases using pentaerythritol monobutyl ester, the above ASA corrosion inhibitor, and stearic acid belonging to straight chain fatty acids, all the peak values of the slip torque were 10 g or less, whereas the peak values were 15 g or more in the cases using sulfonate and amine salt corrosion inhibitors.

From the above, it has been found that ester, ASA and straight chain fatty acid corrosion inhibitors are suitable for the peak-torque descending composition.

EXAMPLES 16 TO 18

Experiment to Obtain an Optimum Amount of a Corrosion Inhibitor to be Added.

To nonane which is a hydrocarbon solvent, 0.25% by weight of trioleyl phosphite which is neutral phosphite ester was added as an extreme pressure agent, and further, as a corrosion inhibitor, pentaerythritol monobutyl ester was added in an amount of 0.1% (Example 16), 0.25% (Example 17) and 0.4% by weight (Example 18) to prepare 3 types of peak-torque descending compositions.

Next, the pinion was placed in a beaker containing the peak-torque descending composition and sonicated for 3 min. Subsequently, the pinion was taken out from the beaker using a strainer, and dried with hot air at from 120 to 150° C. to yield a pinion treated with the peak-torque descending composition.

Next, the center wheel having the slip portion for Watch #10 produced by Citizen Watch Co., Ltd. was made using the pinion obtained by treating as described above and the gearwheel without the treatment.

The peak (maximum) value of the slip torque of the thus made center wheel was measured in the same manner as in Example 1. As mentioned in Example 1, it has been found that the wheel teeth of the plastic gearwheels used for the gear train portion are chipped when the slip torque is over 15 g.

As the results of measurement of the slip torque, when the concentration of the corrosion inhibitor was 0.1% or 0.25% by weight, the peak torque value was 10 g or less. However, when it was 0.4% by weight, the peak torque value was 14 g. From these, it has been found that the amount of corrosion inhibitor to be added is preferably equal to or less than the concentration of the extreme pressure agent.

Also, since the effect of corrosion resistance exerts in the amount ranging from 0.1 to 0.5% by weight, it is preferred that the concentration of the corrosion inhibitor is from 0.01 to 0.5% by weight and is equal to or less than the concentration of the extreme pressure agent.

EXAMPLE 19

(Selection of a Solvent Capable of Being Dried with Hot Air at from 120 to 150° C. Within 10 Minutes)

0.25% by weight of trioleyl phosphite which is neutral phosphite ester was added as an extreme pressure agent to each of hexane (boiling point: 68° C.), nonane (boiling point: 150° C.), decane (boiling point: 174° C.) and dodecene (boiling point: 216° C.) as hydrocarbon solvents to prepare peak-torque descending compositions.

Next, the pinion was placed in a beaker containing the peak-torque descending composition, and sonicated for 3 min. Subsequently, the pinion was taken out from the beaker using a strainer, and dried with hot air at from 120 to 150° C. for 10 min to yield a pinion treated with the peak-torque descending composition.

The obtained pinions were observed under a microscope. As the results, the pinions were all dried when hexane (boiling point: 68° C.), nonane (boiling point: 150° C.), and decane (boiling point: 174° C.) were used for the solvent. However, in the case of using dodecene (boiling point: 216° C.) for the solvent, the solvent remained and drying could not be completed. In the production of the parts of the present invention, it is necessary to complete drying for a short time. If the solvent remained, the parts are adhered in the assembling step of the center wheel, and the parts can not be produced. Therefore, considering actual use conditions, it is preferred that the boiling point of the solvent is 180° C. or less.

EXAMPLE 20 AND COMPARATIVE EXAMPLE 10

(Experiment When a Part Having a Sliding Portion was Treated with the Peak-torque Descending Composition)

A switching lever sliding in a watch component was surface-treated using the peak-torque descending composition containing nonane used in Example 19 as a solvent in the same manner as in Example 19.

Next, the surface-treated switching lever was incorporated into the watch, of which assembling was completed. Switching operation was repeated 1000 times while applying 3 g load to the lever portion (Example 20). Also, for comparison, the similar experiment was carried out using a conventional watch without the surface treatment (Comparative Example 10).

As the results, the initial state could be maintained in a state where abrasion scarcely arose in the watch incorporated with the surface-treated switching lever. However, the sliding portion was scarred in the case of the conventional watch.

From the above, it has been found that the peak-torque descending composition is also effective for treating the component having a sliding portion.

EXAMPLES 21 TO 23

To nonane which is a hydrocarbon solvent, trioleyl phosphite which is a neutral phosphite ester was added in an amount of 0.25% by weight as an extreme pressure agent, and further, as the corrosion inhibitor, pentaerythritol monobutyl ester, ASA corrosion inhibitor represented by the above chemical formula, or stearic acid belonging to straight chain fatty acids was added each in an amount of 0.25% by weight to prepare 3 types of peak-torque descending compositions.

Next, the pinion was placed in a beaker containing the peak-torque descending composition, and sonicated for 3 min. Subsequently, the pinion was taken out from the beaker using a strainer, and dried with warm air at from 20 to 25° C. to yield a pinion treated with the peak-torque descending composition.

Next, the center wheel having the slip portion for Watch #10 produced by Citizen Watch Co., Ltd. was made using the pinion obtained by treating as described above and the gearwheel without the treatment.

The peak (maximum) value of the slip torque of the thus made center wheel was measured in the same manner as in Example 1. As mentioned in Example 1, it has been found that the wheel teeth of the plastic gearwheels used for the gear train portion are chipped when the slip torque is over 15 g.

As the results of measurement of the slip torque, the peak values of the slip torque were 10 g or less in all cases using pentaerythritol monobutyl ester, the above ASA corrosion inhibitor and stearic acid belonging to straight chain fatty acids.

EXAMPLES 24 TO 26

To nonane which is the hydrocarbon solvent, trioleyl phosphite which is neutral phosphite ester was added in an amount of 0.25% by weight as the extreme pressure agent, and further, as the corrosion inhibitor, pentaerythritol monobutyl ester, ASA corrosion inhibitor represented by the above chemical formula, or stearic acid belonging to straight chain fatty acids was added each in an amount of 0.25% by weight to prepare 3 types of peak-torque descending compositions.

Next, the gearwheel of the center wheel was placed in a beaker containing the peak-torque descending composition and sonicated for 3 min. Subsequently, the gearwheel was taken out from the beaker using a strainer, and dried with warm air at from 20 to 25° C. to yield a pinion treated with the peak-torque descending composition.

Next, the center wheel having the slip portion for Watch #10 produced by Citizen Watch Co., Ltd. was made using the gearwheel obtained by treating as described above and the pinion without the treatment.

The peak (maximum) value of the slip torque of the thus made center wheel was measured in the same manner as in. Example 1. As mentioned in Example 1, it has been found that the wheel teeth of the plastic gearwheels used for the gear train portion are chipped when the slip torque is over 15 g.

As the results of measurement of the slip torque, the peak values of the slip torque were 10 g or less in all cases using pentaerythritol monobutyl ester, the above ASA corrosion inhibitor and stearic acid belonging to straight chain fatty acids.

Example 27

The minute wheel of Watch Movement Type No. 20 produced by Citizen Watch Co. Ltd. is made by inserting a pinion into a gearwheel.

A volume of about 1 liter in a 2 liter glass beaker was filled with the peak-torque descending composition wherein 0.5% by weight of tristearyl phosphate was dissolved in nonane, and the pinion was immersed therein for 10 seconds. Then, immediately, the pinion was taken out from the beaker and dried by air at normal temperatures using an electric fan. When the pinion was immersed in the peak-torque descending composition, the composition was not heated, and the pinion immersed in the composition was not sonicated. The time required for drying the above pinion was about 20 min. The normal temperature at that time was about 20° C.

When the thus treated pinion was inserted into an untreated gearwheel, no burr occurred. No inferior article due to the burr was found in one million tests.

If the burr occurs when the minute wheel is produced, the shape of the part was changed and thus a remarkable defect arises in watch performance resulting in inferior operation to lead the problem in that the part can not be used in quality. However, using the peak-torque descending composition of the present invention enabled the use without total inspection.

When the part is not treated with the peak-torque descending composition of the present invention, the burr arises. Therefore, the present applicants have inspected the total parts in the past, and used by selecting the parts with minimal burr. The ratio of occurrence of inferior articles was 3% at that time, and the parts could not be used for mass production without inspection.

EXAMPLE 28

The pinion was treated in the same manner as in Example 27, except that the pinion immersed in and taken out from the peak-torque descending composition was dried with hot air at 100° C. for 13 minutes using a dryer (hot air drying) to shorten the drying time.

When the thus treated pinion was then inserted into an untreated gearwheel, no burr occurred. No inferior article due to the burr was found in one million tests. It has been found that mass productivity of the minute wheels was more improved in the hot air drying relative to the drying at normal temperatures, but the performance between them was not different.

The peak-torque descending composition of the present invention contains from 0.01 to 5% by weight of an extreme pressure agent comprising at least one member selected from the group consisting of neutral phosphate esters and neutral phosphite esters in a solvent comprising at least one member selected from the group consisting of hydrocarbons and ethers. Therefore, a part having a sliding portion which can be made from metallic materials with a simple structure wherein no large peak torque produces at an initial stage when slipped. The part is, for example, a watch part, and there can be assembled a gearwheel body having a slip mechanism which can be made from metallic materials with a simple structure wherein no large peak torque produces at an initial stage when slipped and wherein no defect of wheel teeth even when a plastic gearwheel is used.

In the gearwheel body of the present invention having the above slip mechanism used as a part having a sliding portion, for example a watch part, the sliding portion thereof is treated with the peak-torque descending composition of the present invention. Therefore, no large peak torque occurs at an initial stage when slipped and no defect of wheel teeth has occurred even when a plastic gearwheel is used.

According to the process for producing a component or precision machine having a sliding portion of the present invention, either the component is not heated or the peak-torque descending composition is not heated when the part having a sliding portion is immersed in the peak-torque descending composition. Therefore, the component or precision machine having a sliding portion without developing a large peak torque at an initial stage when slipped can be produced efficiently.

The component or precision machine having a sliding portion of the present invention can be efficiently produced by the above production process.

As shown in the above examples, for example, in the gearwheel having a slip mechanism composed of a gearwheel and a pinion, which is a precision machine having a sliding portion (watch component), at least prior to assembling, the gearwheel or the pinion was surface-treated with the peak-torque descending composition of the invention, and the precision machine (watch) was produced using such a part. Therefore, a center wheel could be made from metallic materials in a simple structure with no complex structure, and a watch excellent in operation reliability could be provided wherein no large peak torque produced at an initial stage when slipped and no defect of wheel teeth occurred even when a plastic gearwheel is used.

Further, the surface treatment of a sliding part of a watch with the peak-torque descending composition of the invention could provide a watch excellent in long term operation reliability with less scraping of the sliding surface even when charged with load.

According to the present invention, there can be provided a press fit method wherein the occurrence of a burr phenomenon is prevented when a shaft is pressed into a metal plate.

What is claimed is:

1. A peak-torque descending composition consisting essentially of from 0.01 to 5% by weight of an extreme pressure agent comprising at least one member selected from the group consisting of neutral phosphate esters and neutral phosphite esters in a removable solvent comprising at least one member selected from the group consisting of hydrocarbons and ethers.

2. A peak-torque descending composition consisting essentially of from 0.01 to 5% by weight of an extreme pressure agent in a solvent comprising at least one member selected from the group consisting of hydrocarbons and ethers, said agent comprising
   at least one member selected from the group consisting of neutral phosphate esters and neutral phosphite esters, and
   at least one corrosion inhibitor selected from the group consisting of esters, partial esters of isodecyl succinate and ethylene oxide (ASA), and straight chain fatty acids.

3. The peak-torque descending composition according to claim 1, wherein the boiling point of the solvent is not more than 180° C.

4. The peak-torque descending composition according to claim 1, wherein the boiling point of the solvent is not more than 130° C.

5. The peak-torque descending composition according to claim 2, wherein the concentration of the corrosion inhibitor is from 0.01 to 0.5% by weight and not more than the concentration of the extreme pressure agent.

6. A part having a sliding portion which is surface-treated with the peak-torque descending composition according to claim 1.

7. The part according to claim 6, which is a watch part.

8. The part according to claim 6, which is a gearwheel body having a slip mechanism made of a metal gearwheel and a metal pinion, and wherein at least prior to assembling the gearwheel body, the gearwheel or the pinion is surface-treated with the peak-torque descending composition according to claim 1.

9. A process for producing one of a component and a precision machine comprising immersing a part having a sliding portion in the peak-torque descending composition according to claim 1 to one of adhere and absorb the composition onto the surface of the part, then immediately, taking out the part from the composition, followed by drying, and assembling a component or precision machine using the part.

10. The process for producing the one of the component and the precision machine according to claim 9, wherein the drying is carried out at normal temperatures.

11. One of a component and a precision machine which is obtained by the process according to claim 9.

12. A press fit method comprising the steps, in pressing a metal shaft into a metal plate, previously immersing one of the metal plate and the shaft in the peak-torque descending composition according to claim 1 to one of adhere and absorb the composition onto an inner surface of a hole for press fit of the one of the metal plate and the surface of the shaft, then immediately, taking out the one of the metal plate and the shaft from the composition, and drying.

13. The peak-torque descending composition according to claim 2, wherein the boiling point of the solvent is not more than 180° C.

14. The peak-torque descending composition according to claim 2, wherein the boiling point of the solvent is not more than 130° C.

15. A part having a sliding portion which is surface-treated with the peak-torque descending composition according to claim 2.

16. The part according to claim 6, which is a gearwheel body having a slip mechanism made of a metal gearwheel and a metal pinion, and wherein at least prior to assembling the gearwheel body, the gearwheel or the pinion is surface-treated with the peak-torque descending composition according to claim 2.

17. A process for producing one of a component and a precision machine comprising immersing a part having a sliding portion in the peak-torque descending composition according to claim 2 to one of adhere and absorb the composition onto the surface of the part, then immediately, taking out the part from the composition, followed by drying, and assembling a component or precision machine using the part.

18. One of a component and a precision machine which is obtained by the process according to claim 17.

19. A press fit method comprising the steps, in pressing a metal shaft into a metal plate, previously immersing one of the metal plate and the shaft in the peak-torque descending composition according to claim 2 to one of adhere and absorb the composition onto an inner surface of a hole for press fit of the one of the metal plate and the surface of the shaft, then immediately, taking out the one of the metal plate and the shaft from the composition, and drying.

20. A press fit method comprising the steps, in pressing a metal shaft into a metal plate, previously immersing one of the metal plate and the shaft in the peak-torque descending composition according to claim 3 to one of adhere and absorb the composition onto an inner surface of a hole for press fit of the one of the metal plate and the surface of the shaft, then immediately, taking out the one of the metal plate and the shaft from the composition, and drying.

21. The process for producing the one of component and the precision machine according to claim 17, wherein the drying is carried out at normal temperatures.

22. A peak-torque descending composition consisting essentially of 0.01 to 5% by weight of an extreme pressure agent in a solvent comprising at least one member selected from the group consisting of hydrocarbons and ethers, said agent comprising
   at least one member selected from the group consisting of neutral phosphate esters and neutral phosphite esters,
   at least one corrosion inhibitor selected from the group consisting of esters, partial esters of isodecyl succinate and ethylene oxide (ASA), and straight chain fatty acids, and
   at least one anti-oxidant selected from the group consisting of phenol anti-oxidant and amine anti-oxidant.

* * * * *